United States Patent
Kannan et al.

(10) Patent No.: US 8,737,599 B2
(45) Date of Patent: May 27, 2014

(54) INTERACTION MANAGEMENT

(71) Applicant: 24/7 Customer, Inc., Campbell, CA (US)

(72) Inventors: Pallipuram V. Kannan, Los Gatos, CA (US); Gangadharan Kumar, Bangalore (IN); Deepak Kumar, Bangalore (IN)

(73) Assignee: 24/7 Customer, Inc., Campbell, CA (US)

( * ) Notice: Subject to any disclaimer, the term of this patent is extended or adjusted under 35 U.S.C. 154(b) by 0 days.

(21) Appl. No.: 13/626,770

(22) Filed: Sep. 25, 2012

(65) Prior Publication Data

US 2013/0129076 A1     May 23, 2013

Related U.S. Application Data

(60) Provisional application No. 61/563,434, filed on Nov. 23, 2011.

(51) Int. Cl.
*H04M 3/00*     (2006.01)
*H04M 5/00*     (2006.01)

(52) U.S. Cl.
USPC ............ 379/265.09; 379/265.01; 379/265.03; 379/265.05; 379/265.11; 379/265.12

(58) Field of Classification Search
USPC ............ 379/265.09, 265.01, 265.02, 265.05, 379/265.11, 265.12, 265.13, 265.03, 379/265.06; 709/227
See application file for complete search history.

(56) References Cited

U.S. PATENT DOCUMENTS

| 5,761,288 | A | 6/1998 | Pinard et al. | |
|---|---|---|---|---|
| 7,426,496 | B2 | 9/2008 | Kristjansson | |
| 7,490,761 | B2 * | 2/2009 | Taylor et al. | 235/379 |
| 7,729,948 | B1 | 6/2010 | Gailloux et al. | |
| 7,949,122 | B1 | 5/2011 | Taylor et al. | |
| 2005/0132298 | A1 | 6/2005 | Lueckhoff et al. | |
| 2007/0061468 | A1 * | 3/2007 | Kelly et al. | 709/227 |
| 2008/0254426 | A1 | 10/2008 | Cohen | |
| 2009/0141872 | A1 | 6/2009 | Li et al. | |
| 2009/0285392 | A1 | 11/2009 | Leitheiser et al. | |
| 2010/0138282 | A1 | 6/2010 | Kannan et al. | |
| 2011/0082874 | A1 | 4/2011 | Gainsboro et al. | |

* cited by examiner

*Primary Examiner* — Thjuan K Addy
(74) *Attorney, Agent, or Firm* — Michael A. Glenn; Perkins Coie LLP (57) ABSTRACT

A company/organization is enabled to optimize sessions from an agent's perspective across multiple channels. Actions may be performed, such as monitoring the journey of a user across a self service application, raising alerts to the agent based on the journey, selecting an appropriate agent to whom a session may be routed, raising alerts for a supervisor, enabling the supervisor to track sessions and intervene if required, enable the agent to run commands from an interaction window, push links to launch applications to supplement the primary interaction through appropriate mechanisms, show appropriate responses to the agent on analyzing the session, and providing shortcut keys for the agent to allow the agent to insert appropriate responses into a chat session. Analysis is provided for the sessions, data is extracted from the sessions, and appropriate forms are populated with the data from the session and with agent information.

9 Claims, 6 Drawing Sheets

INTERACTION MANAGEMENT

CROSS REFERENCE TO RELATED APPLICATIONS

This application claims priority to U.S. provisional patent application Ser. No. 61/563,434, filed Nov. 23, 2011, which is incorporated herein in its entirety by this reference thereto.

BACKGROUND OF THE INVENTION

1. Technical Field

The invention relates to customer relationship management. More particularly, the invention relates to enhancing the customer experience when the customer is using a multi-mode online or voice interaction solution.

2. Description of the Background Art

Currently, when customers of a company face any issues with respect to a service or a product, the customers tend to contact customer service representatives, hereinafter referred to as agents, of the company, either by phone, chat, or any other available media. The customers may also use a combination of existing media. For example, the customer may first try to solve the issue using a self service application or a social networking means and, if unsuccessful, then the customer can contact an agent using a suitable means, such as phone, chat, etc. and, finally, can visit a forum/social network to express an opinion regarding the response from the agent. The agents attempt to solve the issues by spending time to understand the customers' issues, offering appropriate solutions, and so on.

Further, when an agent talks to a customer, either on the phone or using a chat solution, the agent is generally not aware of most of the steps taken by the customer to resolve issues the customer faces, prior to the current conversation. So, the agent may repeat instructions and solutions, which may have already been tried by the customer. This results in wastage of time, resources and money, from both the customer's and the agent's side.

When a customer talks to an agent, either using chat, voice, or a combination of chat and voice, the agent tries to answer queries from the customer and resolve the customer's issues. However, resolving issues using a traditional interaction console is a time consuming affair due to various reasons, such as the agent handling multiple sessions at the same time on chat channel, slow response from the customer, inability of subject matter experts to help in more than one voice call, and so on. This reduces the efficiency of the agent. Also, an increase in the time taken to resolve the issues using chat may result in reluctance on the part of the customer to use chat for future issues.

SUMMARY OF THE INVENTION

A company/organization is enabled to optimize customer sessions from an agent's perspective across multiple channels. Actions may be performed, such as monitoring the journey of a customer across a self service application, raising alerts to the agent based on the journey, selecting an appropriate agent to whom a session may be routed, raising alerts for a supervisor, enabling the supervisor to track sessions and intervene if required, enable the agent to run commands from a chat window, show appropriate responses to the agent on analyzing the session, and providing shortcut keys for the agent to allow the agent to insert appropriate responses into a chat session or use them to resolve voice queries. Analysis is provided for the sessions, data is extracted from the sessions, and appropriate forms are populated with the data from the session and with agent information.

DETAILED DESCRIPTION OF THE INVENTION

Figure 1:
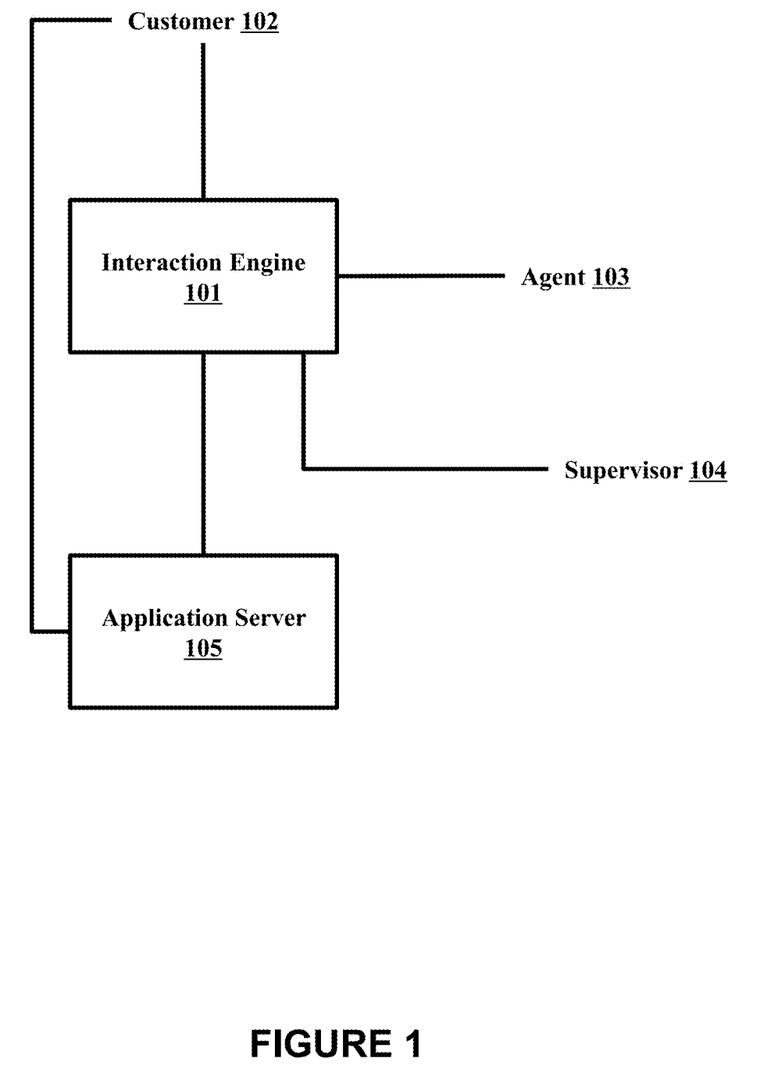
FIG. 1 is a block schematic diagram that depicts a system according to the invention.

Embodiments of the invention herein enable a company/organization to optimize interactions from an agent's perspective across multiple channels, such as chat, voice, etc. FIG. 1 is a block schematic diagram that depicts a system according to the invention. In FIG. 1, an interaction engine 101 and an application server 105 are provided. A customer 102 and an agent 103 may access the interaction engine 101 and may interact with each other during a session using the interaction engine 101. The interaction engine 101 may use chat, voice, or a combination of chat and voice as the mode of interaction. A supervisor 104 may also access the interaction window to monitor an interaction.

The agent 103 may request that the customer 102 access an application via a link that is sent to the customer using the interaction engine 101. The link may be sent in the interaction window, or the link may be pushed to the customers smartphone, or sent to the customer using SMS or otherwise, depending on the customer's preferences. The customer may then launch the application from a phone or any other suitable mechanism. The application may also be launched by the agent on the phone belonging to the customer. The application may be resident on the application server 105. The agent 103 may monitor the progress of the customer 102 via the interaction engine 101 using a suitable mechanism when the customer 102 is using the application. Such mechanism in an embodiment can comprise a monitoring application, and not only a client side JavaScript, because interaction data is pushed from both the monitoring and interaction servers.

The agent 103 or the customer 102 may re-initiate the session at any point in time, as required. For example, the session may be re-initiated if the customer 102 requires guidance at any point in time.

In another example, the session may be re-initiated by the agent 103 if it appears to the agent 103 that the user requires assistance. This may be based on the agent 103 monitoring the progress of the customer 102 or based on alerts generated by the interaction engine 101/application server 105, which alerts have been triggered by pre-specified triggering points/actions. Examples of triggering points/actions include the application not receiving any input from the customer for a specified time, where the specified time is greater than a threshold, errors being thrown up by the actions of the customer 102 as the customer navigates the application, and so on. Whenever there is a period of inactivity greater than a threshold, alerts are displayed in the interaction window to the user, as well as to the leads and the managers via the monitoring application. This helps in reducing the actual handle time of the agent 103 for a session, where the agent can get involved only in scenarios that do need agent assistance as against just keeping the customer company while the customer performs Web based self service that is part of the resolution journey.

The interaction engine 101 may also perform additional actions, such as selecting an appropriate agent to whom a session is routed, raising alerts for a supervisor 104, and enabling the supervisor 104 to track sessions and intervene if required. In any interaction session, the interaction engine 101 performs additional functions, such as enabling the agent 103 to run commands from an interaction window, showing appropriate responses to the agent 103 on analyzing the interaction, and providing shortcut keys that allow the agent to insert appropriate responses. Agents can run special commands from within the interaction window to automate resolution tasks, such as looking up client records for a client ID from the customer relations management system. Instead of going to the customer relations management system and performing the query, agents can run a command and pass the client ID to access this data from within the application. The interaction engine 101 also analyzes the transcript, from the chat session or transcribed from the voice session, extracts data from the text, and populates appropriate forms with the data from the text and agent information. In an embodiment, this is accomplished using text and speech analytics to find the key information nuggets and then using these nuggets in forms and suggestions. For example, problem type, product, etc. can be inferred from text and speech, and pre-populated in forms, instead of having the agent search for them and copy or paste them.

Figure 2:
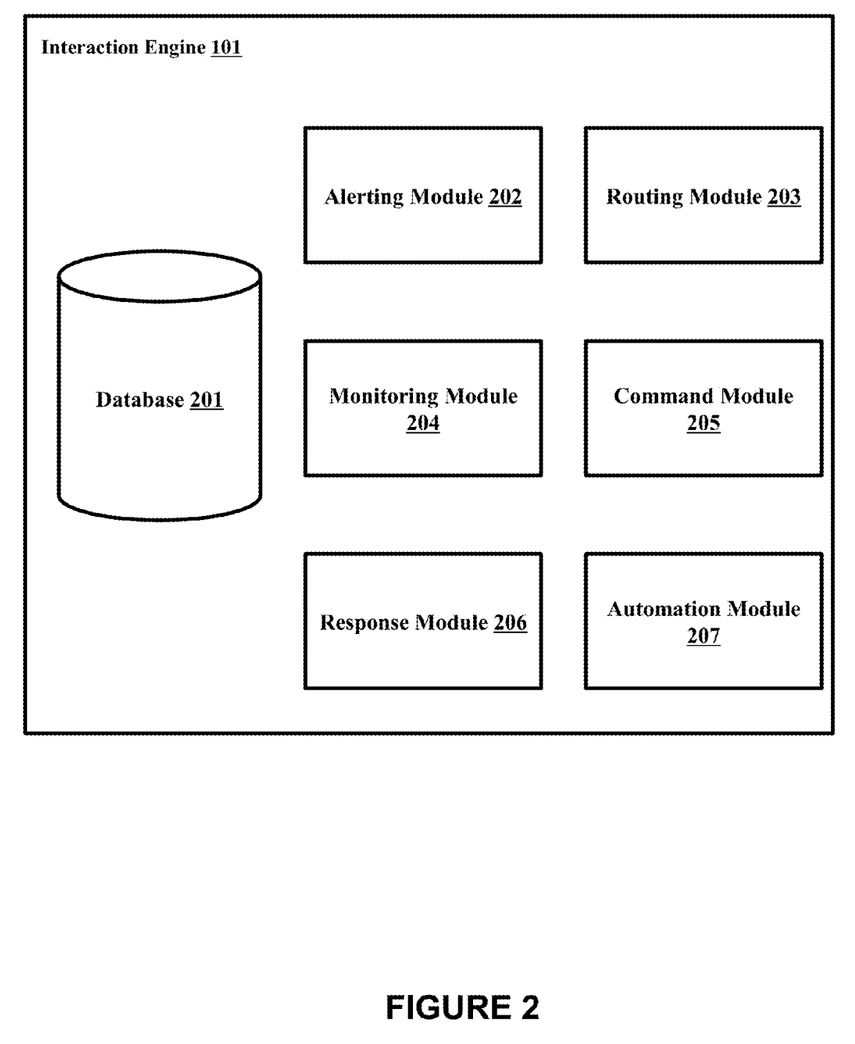
FIG. 2 is a block schematic diagram that depicts an interaction engine according to the invention.

FIG. 2 is a block schematic diagram that depicts an interaction engine according to the invention. In the exemplary embodiment of the invention shown in FIG. 2, the interaction engine 101 comprises a database 201, an alerting module 202, a routing module 203, a monitoring module 204, a command module 205, a response module 206, and an automation module 207.

The database 201 contains data related to sessions, where the sessions may be chat, voice, or a combination of text and voice. The data comprises scores that are assigned to each agent and their respective type of interaction, previous history of a session between a customer and an agent, commonly used interaction snippets, chat text, or speech dialogs and their respective shortcut keys, and so on. This is information that is collected from the conversation transcripts and tracking events defined within the application. All such information is then analyzed using analytical models to arrive at scores, key nuggets, short cuts used, etc.

The alerting module 202 monitors the journey of the customer 102 through an application and raises alerts to the agent 103, based on triggering points/events. The monitoring module tracks users actions, such as time spent, clicks, IVR navigation path, repeated phrases etc. on an application. Depending on the threshold for an application or application step, the alerting module may alert the agent and lead of a user requiring assistance. An example of this is a customer spending more than usual time in filling up a reschedule flight form. The alerting module 202 may be configured to raise alerts when the customer 102 spends a lot of time on a specific page/module with the application or the application does not receive any inputs from the user for pre-defined period of time. For example, if a customer is trying to reschedule his billing cycle and is taking more than the usual time, the alerting module can show an alert in the application which indicates that the customer may need assistance with rescheduling. The alerting module 202 may be configured to raise alerts on the application throwing up errors, where the number, type, and severity of errors may be pre-defined. If a user is lingering in application step while filling a form and the agent side alerts are not being responded to by the agents, then the alerting system can, based on severity of the scenario, alert a lead and/or manager to intervene. The alerting module 202 may also raise an alert when the customer 102 has completed a journey through the application. If a customer completes the steps successfully, even in those scenarios, the agent is notified so he can stop monitoring and dispose of the interaction. This helps reduce total handle time of the interaction. The alert may be posted within the interaction window in line with the other text, in a separate pane within the interaction window, in a pop up window/balloon, or by any other suitable mechanism.

The routing module 203 is configured to perform smart routing of incoming sessions. The routing module 203 routes the sessions to the identified agent 103 based on factors comprising, for example, the type of issue/query expected to be raised by the customer 102, which may be obtained from the previous history of the customer, interaction history, self service history, browsing history, social network history, and so on; predicted scores on agent parameters that are relevant to the type of issue/query expected to be raised by the customer 102; continuity of interaction with an agent that has previously interacted with the customer 102; continuity of interaction between the customer 102 and the same agent across channels; utilization rate of agents; and so on. The interaction server keeps track of the agent who interacted with a customer. A customer can be identified using various mechanisms, such as a browser cookie or a customer ID, such as email, phone ANI, account ID, etc. Based on this information, the next time a customer visits, the customer can be connected to the agent the customer interacted with earlier. It is also possible to connect a customer to a preferred agent configured in the CRM system or similar application. This is usually leveraged in cases where customers can only interact with a designated account manager, etc.

The monitoring module 204 enables the supervisor 104 to monitor sessions, receive alerts based on the sessions, and intervene in the sessions, if required, in real time. The monitoring module 204 enables the supervisor 104 to monitor multiple sessions and send suggested responses to the agent 103, who may then send the suggested responses to the customer 102. The suggested responses to the agent may be sent in line with the chat text, in a separate pane within the chat window, or in a pop up window/box or as a speech dialog. The monitoring module 204 may also raise alerts based on a real time sentiment analysis based alert for monitoring the session, self service event based monitoring alerts, threshold based proactive monitoring alerts on key parameters for the session, traffic volume based health check alerts, and so on. The threshold information is configured by leads and/or managers based on inputs from the reporting systems, and the interaction events are tracked in real time by the application.

The command module 205 enables the agent 103 to execute commands from within the chat window. The command module 205 also enables the agent 103 to pass parameters while executing a command. An example of a command is 'Launch CRM while passing Account ID as 1100111.' The command module 205 accesses pre-defined response templates, integrated forms, features within the application, external applications, and so on based on the command and the parameters, such as, for example:

1. Get account info from customer relations management;
2. Search a term on, for example, Google, Yahoo, or Bing using something such as search "term;"
3. Search map based on a zip code parameter; and
4. Log a case in a case the management system with context from the interaction using a smart command such as log case.

The command module 205 may accept commands from the agent 103 from within the interaction window in line with the text or as a speech dialog or from a separate pane within the interaction window.

The response module 206 enables the agent 103 to use stored chat text or speech dialog to send to the customer 102. There are stored texts or speech dialogs for sending as a response that are either created manually or extracted from historical interaction sessions based on transcription and text mining. These can then be used to suggest appropriate responses that the agent can send using a single click. The response module 206 may enable the agent 103 to send the text using a single click button or shortcut keys. The response module 206 may suggest responses based on the current progress of the interaction, the subject matter of the chat, and so on. This is accomplished in an embodiment, for example, by using text mining of historical data. Predictive models are used to determine the issue type and stage of an interaction and suggest a response that is relevant to the situation. The response module 206 may also track responses, either stored responses or responses typed by the agent 103, which get good feedback and store them in the database 201 for future use. If, for a similar chat in a similar stage in a previous conversation, there has been a highly rated interaction that has been scored high by QA as well, the content of the same can be made available to the agent handling the current interaction for guidance.

The automation module 207 leverages predictive technologies to pre-populate the interaction summary or disposition form. These technologies comprise, in an embodiment, transcription, text mining models, and problem and response prediction models that identify the problem based on the first few dialogs or lines of typed text or intent and/or sentiment based on a dialog or few lines of text. This can be represented in multiple ways, for example as a pre-filled paragraph suggested in the response section or as text blobs appearing in a separate recommendation panel. In the case of the pre-filling of forms, this appears as pre-populated text in the form fields that shows an icon to help to distinguish a suggested entry from one that may have been typed by a user. The automation module 207 may pre-populate the forms in real time based on the analysis of the text from the chat session or transcribed from the voice session, state of the session, past history of the agent 103 and the customer 102, and so on. This is accomplished in an embodiment by using data analytics, text mining, and similar data machine learning and statistical modeling tools. The automation module 207 may also pre-populate the forms with the data of the agent handling the session, such as details of the customer, problem type, "Is it out of scope?," "Was it resolved?," etc. The automation module 207 may also pre-populate the forms with the final state of the session, e.g. has the issue/query been resolved/answered? The automation module 207 may launch the integrated forms within the interaction window. This makes data collection far more accurate and efficient and makes it easier for agents to dispose of sessions and the resulting workflow faster.

Figure 3:
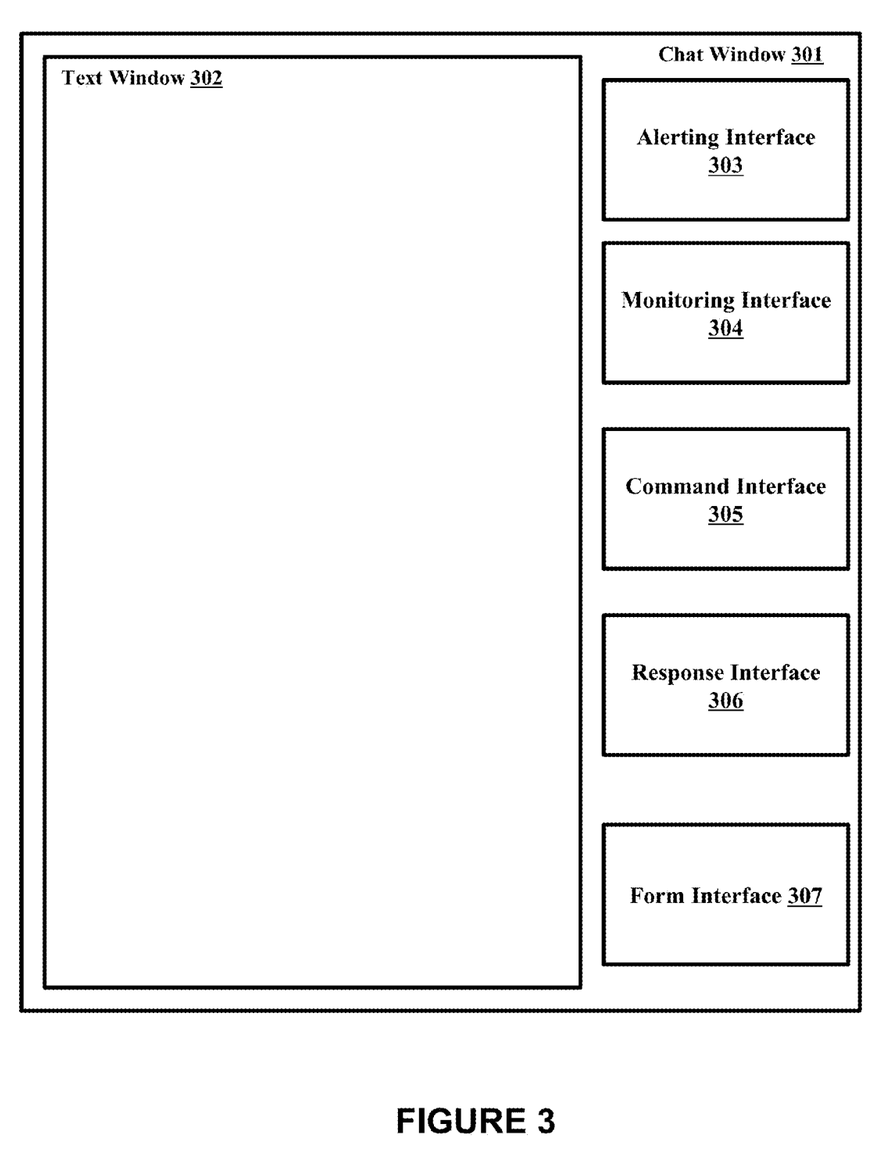
FIG. 3 depicts an interaction window according to the invention.

FIG. 3 depicts an example of an interaction window according to the invention. The interaction window 301 comprises a text window 302, an alerting interface 303, a monitoring interface 304, a command interface 305, response interface 306, and a form interface 307.

The text window 302 contains the interaction transcript between the customer 102 and the agent 103.

The alerting interface 303 displays alerts raised to the agent 103, based on triggering points/events, as the customer 102 journeys through an application.

The monitoring interface 304 displays suggested responses to the agent 103 from the supervisor 104 who is monitoring the chat. The suggested responses may be reviewed by the agent 103 and send to the customer 102 using the text window 301.

The command interface 305 enables the agent 103 to execute commands from within the interaction window. The command interface 303 also enables the agent 103 to pass parameters while executing the command. For example, while looking up a map application, the zip code can be passed—/map 42513; or while looking up an external customer relations management system for customer data, the customer ID can be passed, for example: /custdet andy.harris@acme.com.

The response interface 306 displays a stored interaction transcript to the agent 103, who may then send relevant text to the customer 102 or use it in a dialog with the customer 102. The response interface 306 enables the agent 103 to send the text or use speech dialogs with a single click button or shortcut keys.

The form interface 307 displays the pre-populated interaction summary or disposition form and enables the agent 103 to edit the forms, if required, for example with details of the customer, problem type, "Is it out of scope?," "Was it resolved?," etc.

All or at least one of the interfaces mentioned above may be integrated into the text window, such that the display of the interfaces is in line with the text in the text window 302.

Additional Embodiments

One embodiment engages customers during wait times through games, trivia, and/or music. During peak hours, it is possible that the amount of time it takes for the agents to accept and begin interacting with users is more than the average. In such instances, the customers can be engaged through relevant games and/or trivia to reduce the abandonment rates of chat. For example, during peak scenarios when customers are waiting in queue to be connected to an agent, based on their journey and context that is available, relevant content can be shown or played to the customers so they do not abandon the interaction and stay engaged.

Another embodiment provides a technique to train agents. Agents typically have some idle time in between their interactions with customers. This idle time can be used to train the agents on areas where they may need improvement. Automated visitor bots can play the role of the visitor (playing past interactions) allowing for the agents to engage with the same. They can be rated for these interactions too. Past interactions are assessed and rated on multiple parameters, such as effectiveness, language, product knowledge, customer rating, etc. These can be auto-played as a bot to train new agents and offer chats that increase in sophistication.

Another embodiment applies elements of game play for agent engagement. Basic principles of game play, such as allocating points for interactions or tasks completed, can be leveraged to increase agent engagement and improve effectiveness. For example, key parameters can be tracked against the team, such as for example High CSAT, Training Scores, Product Knowledge Scores, QA Scores, Handle Time scores, etc. Based on each individual interaction, these parameters can be calculated, scored, and shared on the social portal of the team. On achieving key accomplishments, the team members are awarded badges and the congratulatory message is published on the portal and/or message board. Leaderboards and contests (on points) are other ways by which the above mentioned objectives can be accomplished.

Another embodiment provides smart recommendation to agents. In this embodiment, the system can leverage available data, such as chat or voice transcripts, user information, enterprise data, past performance, etc. to narrow down and offer smarter recommendations to agents, e.g. these could be cross-sell, up-sell recommendations in sales scenarios and co-occurring issues in service scenarios. In the case of a customer who is buying Model A laptop, based on predictive analytics, the agent may be offered a suggestion to upsell, e.g. mouse and battery, because they are likely to be bought together. In another case of Model B laptop, the suggestion may be to offer a laptop case and additional warranty to the customer. These are likely influencers in increasing the customer satisfaction and for improving performance.

Figure 4:
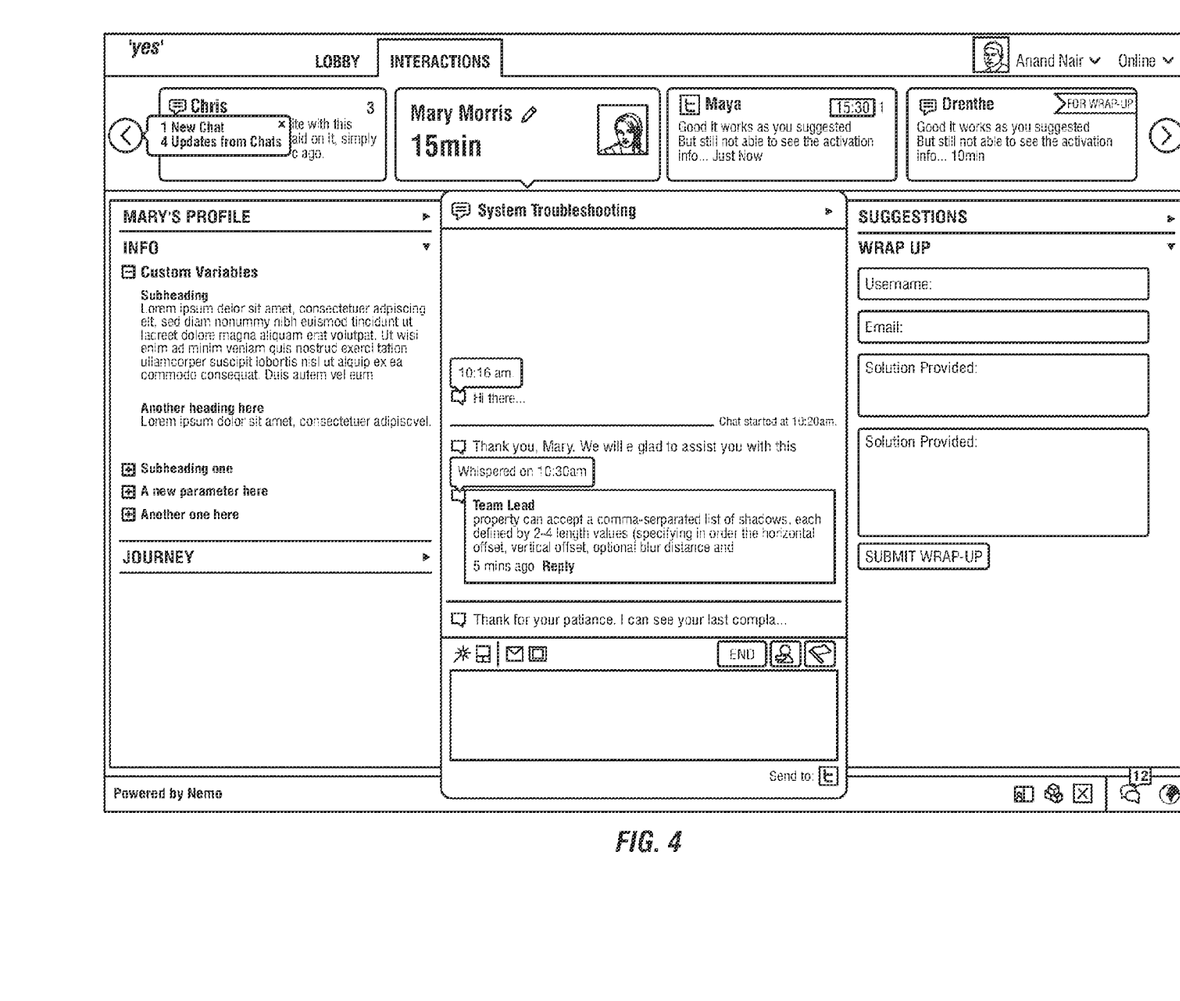
FIG. 4 is a screen shot that depicts a first view of an interaction carousel according to the invention.
Figure 5:
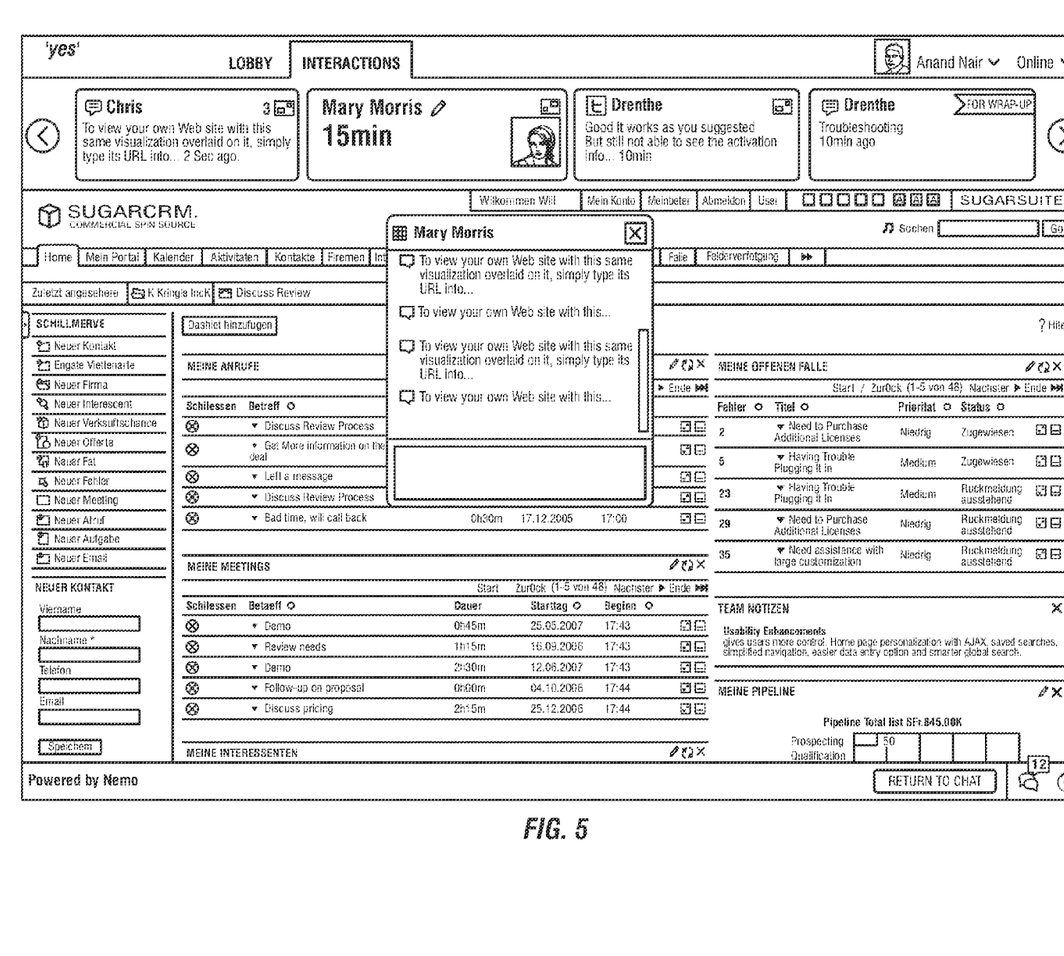
FIG. 5 is a screen shot that depicts a second view of an interaction carousel according to the invention.
Figure 6:
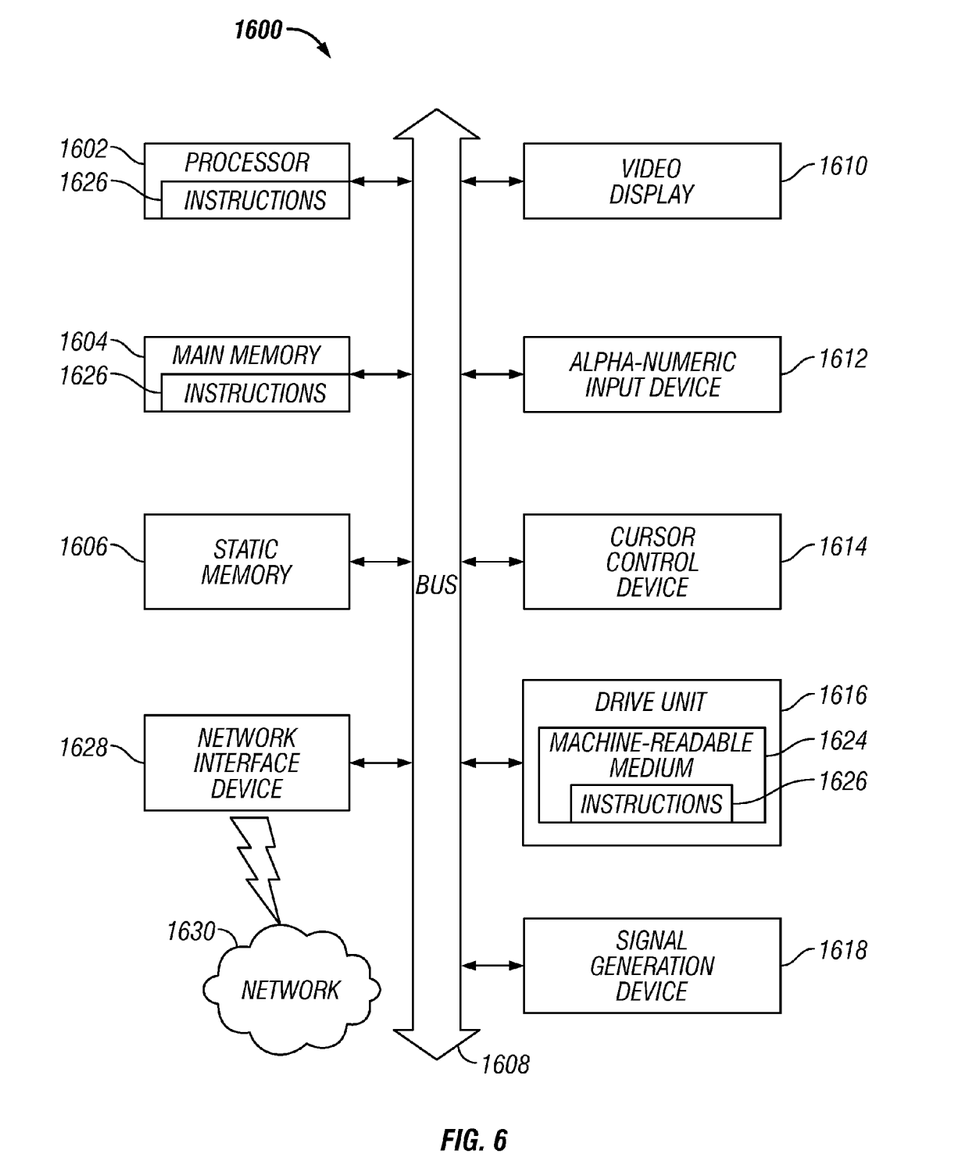
FIG. 6 is a block schematic diagram that depicts a machine in the exemplary form of a computer system within which a set of instructions for causing the machine to perform any of the herein disclosed methodologies may be executed.

In another embodiment, an interaction window is provided in the form of a carousel in which customer information is displayed (Chris, Mary Morris, etc.), and in which the display of customer information is provided in a rich fashion. FIG. 4 is a screen shot that depicts a first view of an interaction carousel according to the invention; and FIG. 5 is a screen shot that depicts a second view of an interaction carousel according to the invention. This embodiment of the invention enables concurrency without switching across interactions, i.e. key messages show up in the carousel itself, e.g. on top of the appropriate box, thus enabling agents to keep track of multiple interactions while continuing to focus on the active interaction.

Different ways are provided by which the leads can assist the agents. In the interactions area, special commands can be initiated by prefixing the commands with a command character (FIG. 4). This aspect of the invention is referred to as smart commands. As shown in in FIG. 5, another embodiment of the invention provides the ability to encapsulate another application inside of the console, thereby to enable the agent to consume different types of information while continuing to interact with the end user.

A further embodiment of the invention allows the agent to push smart forms, applications, etc. to customers, which then show up in a slider on the customer's device (see commonly assigned U.S. patent application Ser. No. 13/107,655, filed May 13, 20111, which application is incorporated herein in its entirety by this reference thereto). In this embodiment, the agent can initiate the opening and/or closing of the sliders and the type of content that is shown therein.

Computer Implementation

FIG. 4 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. Apparatus for management of online customer/agent interaction across multiple channels, comprising:
   a processor implemented interaction engine that is configured for accessibility by at least one customer and at least one agent for interaction during a session between said at least one customer said at least one agent via any of chat, voice, and a combination of chat and voice as the mode of interaction;
   said interaction engine configured to send a link to said customer at said agent's request to allow said customer to access an application at a processor implemented application server on which said application is resident and to which said link is resolved for customer access to, and launching of, said application; and
   said interaction engine configured to allow said agent to proactively monitor progress of the customer while the customer is using said application;

said interaction engine comprising:
  a database comprising any of:
    data related to sessions, said sessions comprising any of chat, voice, and a combination of text and voice;
    data comprising scores that are assigned to each agent and their respective type of interaction;
    data comprising previous history of a session between a customer and an agent; and
    data comprising commonly used chat text snippets and their respective shortcut keys;
  an alerting module configured for monitoring a journey of the customer through an application and raising alerts to the agent based on triggering points/events;
  a routing module configured to perform smart routing of incoming sessions to an identified agent based on one or more factors;
  a monitoring module configured to enable a supervisor to monitor sessions, receive alerts based on the sessions, and intervene in the sessions, if required in real time; wherein the supervisor is enabled to monitor multiple sessions and send suggested responses to the agent, who is enabled to send said suggested responses to the customer;
  a command module configured for any of:
    enabling the agent to execute commands from within an interaction window;
    enabling the agent to pass parameters while executing a command;
    accessing pre-defined response templates, integrated forms, features within the application, and external applications based on said commands and parameters; and
    accepting commands from the agent;
  a response module configured for any of:
    enabling the agent to send stored chat text to the customer;
    enabling the agent to send chat text or a speech dialog using any of a single click button and shortcut keys;
    suggesting responses based on any of current progress of an interaction and the subject matter of the interaction;
    tracking any of stored responses and responses typed by the agent which get good feedback and storing said response in the database for future use; and
  an automation module configured for leveraging predictive technologies to pre-populate any of an interaction summary and disposition form.

2. The apparatus of claim 1, said alerting module configured to raise alerts any of:
  when the customer spends more than a threshold amount of time at a step or on a specific page/module with the application;
  when the application does not receive any inputs from the user for pre-defined period of time;
  when the application throws up errors, where the number, type, and severity of errors is pre-defined; and
  when the customer has completed a journey through the application.

3. The apparatus of claim 1, said alerting module configured to poste the alert within any of an interaction window in line with chat text, a separate pane within the interaction window, and a pop up window/balloon.

4. The apparatus of claim 1, said routing module factors comprising any of:
  type of issue/query expected to be raised by the customer, which is obtained from any of a previous history of the customer, call history, chat history, self service history, browsing history, and social network history;
  predicted scores on agent parameters that are relevant to a type of issue/query expected to be raised by the customer;
  continuity of interaction with an agent that has previously interacted with the customer;
  continuity of interaction between the customer and a same agent across channels; and
  utilization rate of agents.

5. The apparatus of claim 1, said monitoring module configured to send suggested responses to the agent via any of in line with chat text, in a separate pane within the interaction window, and in a pop up window/box.

6. The apparatus of claim 1, said monitoring module configured to raise alerts based on any of a real time sentiment analysis based alert for monitoring the session, self service event based monitoring alerts, threshold based proactive monitoring alerts on key parameters for the session, and traffic volume based health check alerts.

7. The apparatus of claim 1, said automation module configured for pre-populating said forms in real time based on any of:
  analysis of text from a chat session and text transcribed from a voice session;
  state of the session;
  past history of the agent and the customer;
  data of the agent handling the session; and
  a final state of the session.

8. The apparatus of claim 1, said automation module configured for launching integrated forms within an interaction window.

9. Apparatus for management of online customer/agent interaction across multiple channels, comprising:
  a processor implemented interaction engine that is configured for accessibility by at least one customer and at least one agent for interaction during a session between said at least one customer said at least one agent via any of chat, voice, and a combination of chat and voice as the mode of interaction;
  said interaction engine configured to send a link to said customer at said agent's request to allow said customer to access an application at a processor implemented application server on which said application is resident and to which said link is resolved for customer access to, and launching of, said application; and
  said interaction engine configured to allow said agent to proactively monitor progress of the customer while the customer is using said application;
  said interaction engine comprising:
    providing a database comprising any of:
      data related to sessions, said sessions comprising any of chat, voice, and a combination of text and voice;
      data comprising scores that are assigned to each agent and their respective type of interaction;
      data comprising previous history of a session between a customer and an agent; and
      data comprising commonly used chat text snippets and their respective shortcut keys;
    monitoring a journey of the customer through an application with an alerting module and raising alerts to the agent based on triggering points/events;
    performing smart routing of incoming sessions with a routing module configured to an identified agent based on one or more factors;
    enabling a supervisor to monitor sessions, receive alerts based on the sessions, and intervene in the sessions, if required in real time with a monitoring module; wherein the supervisor is enabled to monitor multiple sessions and send suggested responses to the agent, who is enabled to send said suggested responses to the customer;

providing a command module configured for any of:
  enabling the agent to execute commands from within an interaction window;
  enabling the agent to pass parameters while executing a command;
  accessing pre-defined response templates, integrated forms, features within the application, and external applications based on said commands and parameters; and
  accepting commands from the agent;

providing a response module configured for any of:
  enabling the agent to send stored interaction transcript snippets to the customer;
  enabling the agent to send chat text using any of a single click button and shortcut keys;
  suggesting responses based on any of current progress of an interaction and the subject matter of the interaction;
  tracking any of stored responses and responses typed by the agent which get good feedback and storing said response in the database for future use; and leveraging predictive technologies with an automation module to pre-populate any of an interaction summary and disposition form.

* * * * *